US008150875B1

(12) United States Patent
Dubrovsky et al.

(10) Patent No.: US 8,150,875 B1
(45) Date of Patent: Apr. 3, 2012

(54) METHOD AND AN APPARATUS TO STORE INFORMATION REGARDING WEB PAGES

(75) Inventors: Alex M. Dubrovsky, San Mateo, CA (US); Nikolay V. Popov, Cupertino, CA (US); Alexander Shor, Sunnyvale, CA (US); Roman Yanovsky, Los Altos, CA (US); Shunhui Zhu, San Jose, CA (US); Boris Yanovsky, Saratoga, CA (US)

(73) Assignee: SonicWALL, Inc., Sunnyvale, CA (US)

( * ) Notice: Subject to any disclaimer, the term of this patent is extended or adjusted under 35 U.S.C. 154(b) by 1684 days.

(21) Appl. No.: 10/942,292

(22) Filed: Sep. 15, 2004

Related U.S. Application Data

(60) Provisional application No. 60/574,091, filed on May 24, 2004.

(51) Int. Cl.
*G06F 7/00* (2006.01)
(52) U.S. Cl. ............... 707/783; 725/25; 725/28; 725/31
(58) Field of Classification Search .................. None
See application file for complete search history.

(56) References Cited

U.S. PATENT DOCUMENTS

| | | | | |
|---|---|---|---|---|
| 6,295,559 B1 * | 9/2001 | Emens et al. | ................. | 709/225 |
| 6,336,117 B1 * | 1/2002 | Massarani | ..................... | 707/100 |
| 6,449,766 B1 * | 9/2002 | Fleming | ......................... | 725/28 |
| 6,772,214 B1 * | 8/2004 | McClain et al. | .............. | 709/229 |
| 2003/0110272 A1 * | 6/2003 | du Castel et al. | ............. | 709/229 |

OTHER PUBLICATIONS

Jim Miller, Paul Resnick and David Singer, Rating Services and Rating Systems (and Their Machine Readable Descriptions), Version 1.1 ,W3C Recommendation Oct. 31, 1996.*
Chu, Yang-Hua, et al. "PICS Signed Labels (DSig)" 1.0 Specification. W3C Recommendation May 27, 1998. Philip DesAutels, author.

* cited by examiner

*Primary Examiner* — Tim T Vo
*Assistant Examiner* — Hasanul Mobin
(74) *Attorney, Agent, or Firm* — Blakely Sokoloff Taylor & Zafman LLP (57) ABSTRACT

A method and an apparatus to store information regarding web pages have been disclosed. In one embodiment, the method includes receiving a predetermined type of information regarding a web page in a domain from a server, using a subset of the information to evaluate the web page based on one or more predetermined policies, and locally storing the subset of the information. Other embodiments have been claimed and described.

20 Claims, 7 Drawing Sheets

Sample Rating Categories:

| Category | Rating |
|---|---|
| Sports | 0x1000 |
| News | 0x0100 |
| Emails | 0x0010 |
| Entertainment | 0x0001 |

330

Sample Content Filtering Policies:

Block all Entertainment content. ← 340
Block all Email contents. ← 342
Block all Sports and Entertainment contents. ← 344

Sample Rating Assigned to the web pages:

| Web page | Content Rating Assigned | Type of Content Rating Assigned |
|---|---|---|
| www.contentprovider1.com | 1101 | untrusted rating ← 351 |
| www.contentprovider2.com | 0001 | trusted rating ← 352 |

METHOD AND AN APPARATUS TO STORE INFORMATION REGARDING WEB PAGES

REFERENCE TO RELATED APPLICATION

This application claims the benefit of U.S. Provisional Application No. 60/574,091, filed on May 24, 2004.

FIELD OF INVENTION

The invention relates to web pages, and more particularly, to storing information regarding web pages.

BACKGROUND

Today, various content filtering mechanisms are available to entities to manage and/or control user access to the Internet via facilities provided by the entities. For example, a company typically implement some form of content filtering mechanism to control the use of the company's resources (e.g., employee work hours, computers, and/or servers) to access the Internet. Access to contents within certain predetermined categories using the company's resources may not be allowed during some predetermined periods of time.

A conventional content filtering system includes a database of content ratings. A rating is a classification of a web page based on some predetermined criteria. For example, www.cnn.com may be classified in the news category, www.amazon.com may be classified in the shopping category, etc. Depending on the content filtering criteria, one may classify web pages into different number of categories. The number of categories may range from two (e.g., sports and non-sports) to a large number (e.g., 50, 100, etc.) to provide more elaborate classification.

Currently, one way to handle content ratings of web pages is to assign a rating for each individual web page on the Internet. However, given the huge number of web pages available on the Internet, this approach is very inefficient because this approach generates a large volume of content rating information. It is also costly to store and/or to deliver such a large volume of data.

Another existing approach to handle content rating of web pages is to simply assign only domain level rating information. That is, a rating assigned to the main page of a domain is also assigned to the entire domain. As a result, only domain level rating information is stored in the databases and transmitted to content filtering clients. Although this approach reduces the amount of content rating to be stored, the domain level rating information is typically inadequate for accurately rating an individual web page because many domains include a wide variety of contents in the sub-directories in the domain.

SUMMARY

The invention includes a method and an apparatus to store information regarding web pages. In one embodiment, the method includes receiving a predetermined type of information regarding a web page in a domain from a server, using a subset of the information to evaluate the web page based on one or more predetermined policies, and locally storing the subset of the information.

In a specific embodiment, the information requested includes content ratings of the web pages.

Other features of the invention will be apparent from the accompanying drawings and from the detailed description that follows.

BRIEF DESCRIPTION OF THE DRAWINGS

The invention is illustrated by way of example and not limitation in the figures of the accompanying drawings, in which like references indicate similar elements and in which.

DETAILED DESCRIPTION

A method and an apparatus to store information regarding web pages are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
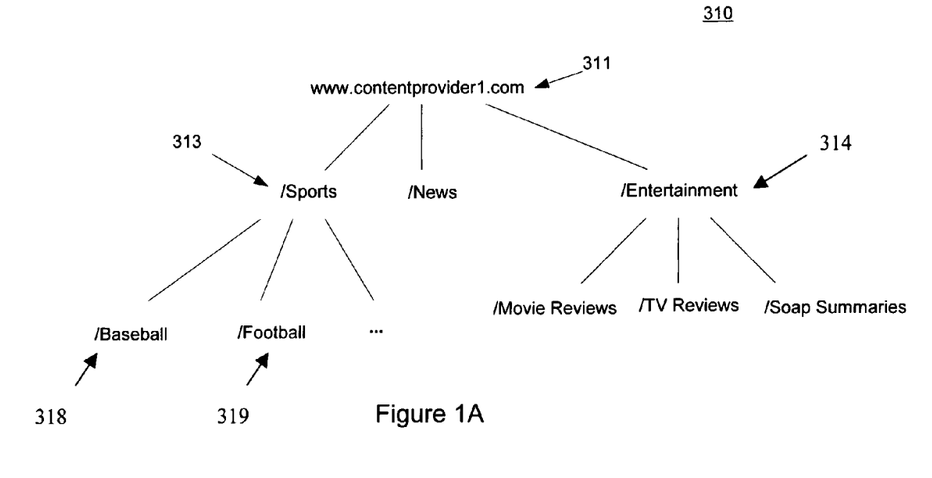
FIG. 1A illustrates a first example of a domain structure.

Web pages of a domain are typically organized into tree-like structures, which may also be referred to as domain trees. The Uniform Resource Locators (URLs) of web pages also typically reflect such tree-like structures. FIG. 1A illustrates one domain tree of a first exemplary domain, www.contentprovider1.com 310. The web page, www.contentprovider1.com 311 at the root of the domain tree may be referred to as the main page. Under the main page 311, there are three subdirectories on the first level, including "/Sports", "/News", and "/Entertainment." Each sub-directory may further include more sub-directories on the next level. For example, the sub-directory "/Sports" further includes the sub-directories: "Baseball", and "/Football", etc. on the second level. Likewise, the sub-directory "/Entertainment" further includes the sub-directories: "/Movie Reviews", "/TV Reviews", and "/Soap Summaries." The domain structure may be referred to as a domain tree, where the sub-directories are the nodes of the domain tree and the main page is the root of the domain tree.

Figure 1B:
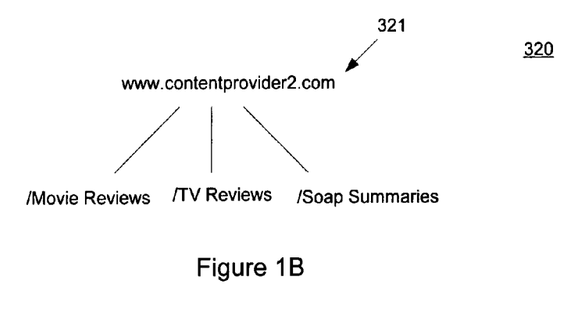
FIG. 1B illustrates a second example of a domain structure.

FIG. 1B illustrates the domain structure of a second exemplary domain, www.contentprovider2.com 320. Under the main page of www.contentprovider2.com 321, there are three subdirectories on the first level, namely, "/Movie Reviews", "/TV Reviews", and "/Soap Summaries."

Figure 1C:
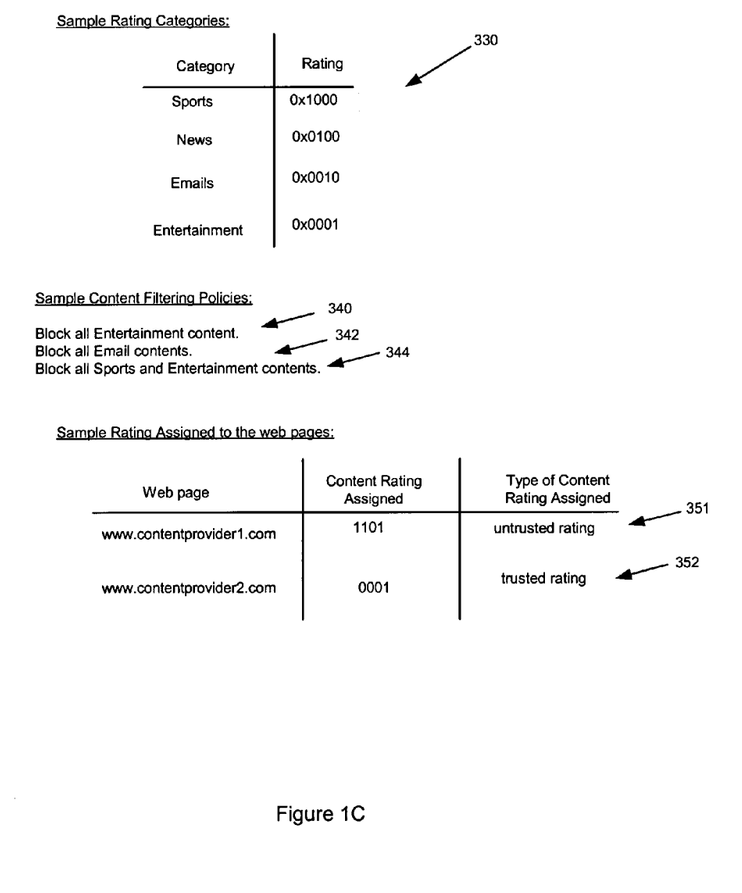
FIG. 1C illustrates a set of exemplary rating categories, some exemplary content filtering policies, and the exemplary content ratings assigned to the main pages of the domains in FIGS. 1A and 1B according to one embodiment of the invention.

FIG. 1C illustrates some sample content categories 330, some sample content filtering policies 340, and some sample ratings assigned to the main page and web pages in each of the domains shown in FIGS. 1A and 1B. Different numbers of content categories may be defined in various embodiments. For the purpose of simplifying the illustration, only four categories are defined in FIG. 1C, including Sports, News, Email, and Entertainment. However, different number of categories may be defined in different embodiments, such as 64, 128, etc. Each of the content categories is assigned a rating (hereinafter referred to as a category rating), which may include a binary number. For example, referring to FIG. 1C, the rating of Sports is 1000, while the rating of Entertainment is 0001.

Web pages are rated based on their contents using the category ratings. The rating of a web page is hereinafter referred to as a content rating. In one embodiment, there are two kinds of content ratings, namely, trusted ratings and untrusted ratings. If a web page and all the sub-directories thereof are likely to contain contents in one or more predetermined categories, the web page is assigned a trusted rating. For example, referring to FIG. 1A, the web page, www.contentprovider1.com/Sports 313 is likely to contain only contents in the sports category. Therefore, a trusted rating may be assigned to the web page www.contentprovider1.com/Sports 313. In one embodiment, the trusted rating includes the corresponding category rating and a flag that indicates the content rating is a trusted rating. The flag may be a bit written into a predetermined field. For example, a value of 0 indicates the rating is untrusted while a value of 1 indicates the rating is trusted. Referring back to the previous example, the web page www.contentprovider1.com/Sports 313 is assigned a content rating having the binary integer 1000, which corresponds to the category rating of Sports, and a trusted rating flag set.

In addition to the trusted ratings, content ratings also include untrusted ratings. When a web page and the sub-directories thereof contain contents in different categories, an untrusted rating may be assigned to the web page. In one embodiment, an untrusted rating includes a bit pattern of a predetermined length (e.g., 64-bit long, 16-bit long, etc.) and a flag indicating that the rating is untrusted. Ratings of the sub-directories of the web page may be encoded into the bit pattern. In one embodiment, the bit pattern of the untrusted rating includes a bitwise union of the ratings of the sub-directories of the web page.

For example, consider the exemplary domain, www.contentprovider1.com 310 in FIG. 1A. Since the sub-directories of www.contentprovider1.com 310 contain contents in different categories (i.e., Sports, News, and Entertainment), an untrusted rating may be assigned to www.contentprovider1.com 310. The untrusted rating may include a binary number resulted from performing a union operation on the ratings of the different categories. The category ratings of Sports, News, and Entertainment are 1000, 0100, and 0001, respectively. Therefore, according to one embodiment of the invention, the bit pattern of the untrusted rating of www.contentprovider1.com 311 is 1000 or 0100 or 0001=1101. Like the trusted rating, the untrusted rating may further include a flag to indicate that the rating is untrusted.

The content ratings of the domains 310 and 320 according to one embodiment of the invention are summarized below in Table 1.

TABLE 1

Content Rating of Web Pages in Domains 310 and 320

| Web Page | Content Rating | Rating Type (Trusted or Untrusted) |
| --- | --- | --- |
| www.contentprovider1.com | 1101 | Untrusted |
| www.contentprovider1.com/Sports | 1000 | Trusted |
| www.contentprovider1.com/Sports/Baseball | 1000 | Trusted |
| www.contentprovider1.com/Sports/Football | 1000 | Trusted |
| www.contentprovider1.com/News | 0100 | Trusted |
| www.contentprovider1.com/Entertainment | 0001 | Trusted |
| www.contentprovider1.com/Entertainment/Movie_Reviews | 0001 | Trusted |
| www.contentprovider1.com/Entertainment/TV_Reviews | 0001 | Trusted |
| www.contentprovider1.com/Entertainment/Soap_Summary | 0001 | Trusted |
| www.contentprovider2.com | 0001 | Trusted |
| www.contentprovider2.com/Movie_Reviews | 0001 | Trusted |
| www.contentprovider2.com/TV_Reviews | 0001 | Trusted |
| www.contentprovider2.com/Soap_Summary | 0001 | Trusted |

Applying the above technique, a content rating (a trusted rating or an untrusted rating) can be assigned to each web page in a domain. A rating structure corresponding to the domain structure may be constructed from the content ratings of the web pages within the domain. As discussed above, many domains are typically organized in tree-like structures. Hence, the content ratings of the web pages within these tree-like domains may be used to construct rating trees. In one embodiment, the root of a rating tree of a domain contains the content rating of the main page of the domain and each node of the rating tree contains the content rating of the corresponding web page in the domain.

Figures 1D, 1E:
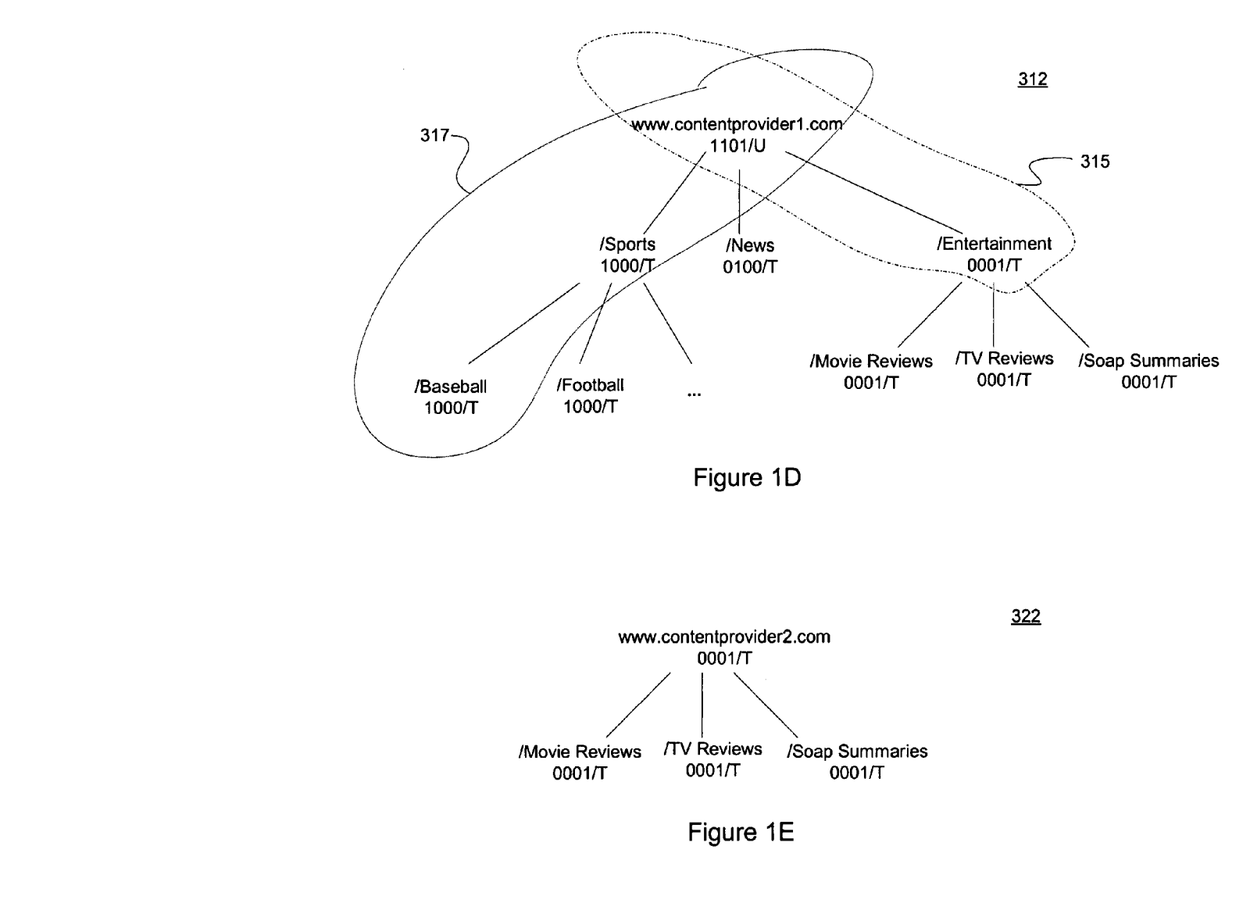
FIG. 1D illustrates an exemplary rating tree of the domain 310 shown in FIG. 1A.
FIG. 1E illustrates an exemplary rating tree of the domain 320 shown in FIG. 1B.

FIG. 1D illustrates an exemplary rating tree 312 corresponding to the domain 310 shown in FIG. 1A. Each node in the rating tree 312 includes a content rating of the corresponding sub-directory or web page within the domain 310. Likewise, FIG. 1E shows another exemplary rating tree 322 corresponding to the domain 320 in FIG. 1B. Each content rating in FIGS. 1D and 1E includes a binary number derived from the category ratings in FIG. 1C based on the content of the corresponding web page. In addition, each rating includes a flag, "T" or "U", to indicate whether the rating is a trusted or an untrusted rating, respectively.

Content ratings of web pages may be assigned manually or automatically. In one embodiment, a server constructs rating trees for domains using content ratings of web pages within the domains. The server may store the rating trees in a database coupled to the server. In the current description, the server that constructs and stores rating structures is referred to as an authoritative server. When a content filtering client (CFC) requests the content rating of a web page in a domain from the authoritative server, the authoritative server identifies a node in a rating tree corresponding to the web page of the domain. The server puts the portion of the rating tree (which may be referred to as a branch) containing the identified node, the root, and any additional nodes that links the node identified to the root may be referred to as a branch.

In one embodiment, the authoritative server puts the branch into a response. For example, referring to the rating tree 312 in FIG. 1D. In response to a request for the content rating of the web page www.contentprovider1.com/Entertainment 314 in FIG. 1A, an authoritative server may put the branch 315 into a response. Likewise, in response to a request for the content rating of the web page www.contentprovider1.com/Sports/Baseball 318, an authoritative server may put the branch 317 into a response. In some embodiments, the authoritative server encrypts the response containing the branch 317. Then the authoritative server sends the response to the CFC. More detail of some embodiments of the process for requesting and sending content ratings and an exemplary system including the authoritative server and the CFC are discussed below.

The CFCs may adopt various content filtering policies in different embodiments. For example, in an office, it may be inappropriate for employees to browse web pages of entertainment content. Thus, the CFC in the office may block access to all contents in the Entertainment category. Such a content filtering policy, "Block all Entertainment contents" 340 is shown in FIG. 1C. Another exemplary content filtering policy in FIG. 1C is "Block all Email contents" 342. In some embodiments, the CFC may block contents in multiple categories. For example, the third exemplary content filtering policy shown in FIG. 1C is "Block all Sports and Entertainment contents" 344. Based on the content filtering policy, the CFC evaluates the content ratings received from an authoritative server to decide how many of those content ratings to store locally at the CFC.

To illustrate how a CFC may decide how many content ratings to store locally, consider the branch 317 in the rating tree in FIG. 1D. Suppose the content filtering policy of an exemplary CFC is to block all email contents (e.g., the policy 340 in FIG. 1C). By evaluating the untrusted rating of the main page www.contentprovider1.com, i.e., 1101/U, the CFC can determine that the main page and the sub-directories thereof do not contain any email content. Under the policy 340, the CFC can decide to pass the web pages under www.contentprovider1.com without checking further. Therefore, locally storing only the content rating of the main page 311 in the CFC would suffice for the purpose of content filtering in this example.

In another example, the content filtering policy of the CFC is to block all entertainment contents (e.g., the policy 342 in FIG. 1C). The bit pattern of the untrusted rating of the main page 311 of the domain 310 in FIG. 1A, i.e., 1101, indicates that some, but not all, of the main page and the sub-directories thereof contain entertainment content. Thus, the CFC cannot decide whether to block the web page in the sub-directory www.contentprovider1.com/Sports/Baseball based on solely the content rating of the main page 311. The CFC may evaluate the content rating of the sub-directory, www.contentprovider1.com/Sports 313 in FIG. 1A, on the next level of the branch 317, i.e., 1000/T. Based on 1000/T, the CFC can decide that www.contentprovider1.com/Sports 313 and the sub-directories thereof contain only sports content, i.e., no entertainment content. Under the policy 342, the CFC may decide to pass www.contentprovider1.com/Sports and/or any web page in the sub-directories thereof without checking further. Therefore, the CFC may locally store only the content ratings of www.contentprovider1.com and www.contentprovider1.com/Sports in order to enforce the content filtering policy 342 in this example.

Furthermore, the CFC may use the locally stored content ratings to allow or block subsequent requests to access some web pages. Refer back to the above example, in which the content ratings of www.contentprovider1.com and www.contentprovider1.com/Sports have been locally stored in the CFC. In response to a subsequent request to access another web page, www.contentprovider1.com/Sports/Football 319 in FIG. 1A, the CFC may use the locally stored content rating of www.contentprovider1.com/Sports (i.e., 1000/T) to decide that the requested page contains sports content only. Thus, the CFC may pass the requested web page based on the locally stored content ratings without requesting more content ratings from the authoritative server. Note that to enforce the content filtering policy 342, the CFC may not need to locally store the content ratings of www.contentprovider1.com/Sports/Football 319 and other sub-directories of www.contentprovider1.com/Sports 313.

In sum, a CFC may evaluate the content ratings received from the authoritative server to decide how much of those content ratings to store locally based on the content filtering policy of the CFC. The CFC may not have to locally store all content ratings in a branch of a rating tree received. The CFC may locally store only as much content ratings in the branch as needed to determine whether the content of a web page and the sub-directories thereof is in one or more categories relevant to the content filtering policy of the CFC.

One advantage of the above approach is to improve the efficiency in storing content rating at the CFC because, instead of storing a rating for each individual web page, the above approach stores only as much content ratings as needed for the CFC to determine whether a web page should be blocked or passed. Since significantly less content ratings is stored, a set-top box having a local storage device (e.g., RAM, flash memories, etc.) can be deployed at the client's site to locally store the content rating as needed. Unlike some existing content filtering systems, which include an expensive server and/or a database at the client's site, the above approach provides significant cost savings by allowing the client to use a relatively inexpensive set-top box. Furthermore, under the above approach, some subsequent requests for web pages within the same domain may be handled using the locally stored content ratings. Thus, the volume of traffic for transmitting content ratings from the authoritative server to the CFC may be reduced. Another advantage of using the locally stored content ratings is to reduce latency of web page access caused by content filtering because it is generally faster to retrieve locally stored content ratings than to request content ratings from a server. These advantages contribute to improving the overall efficiency of content filtering and web page access.

Figure 2:
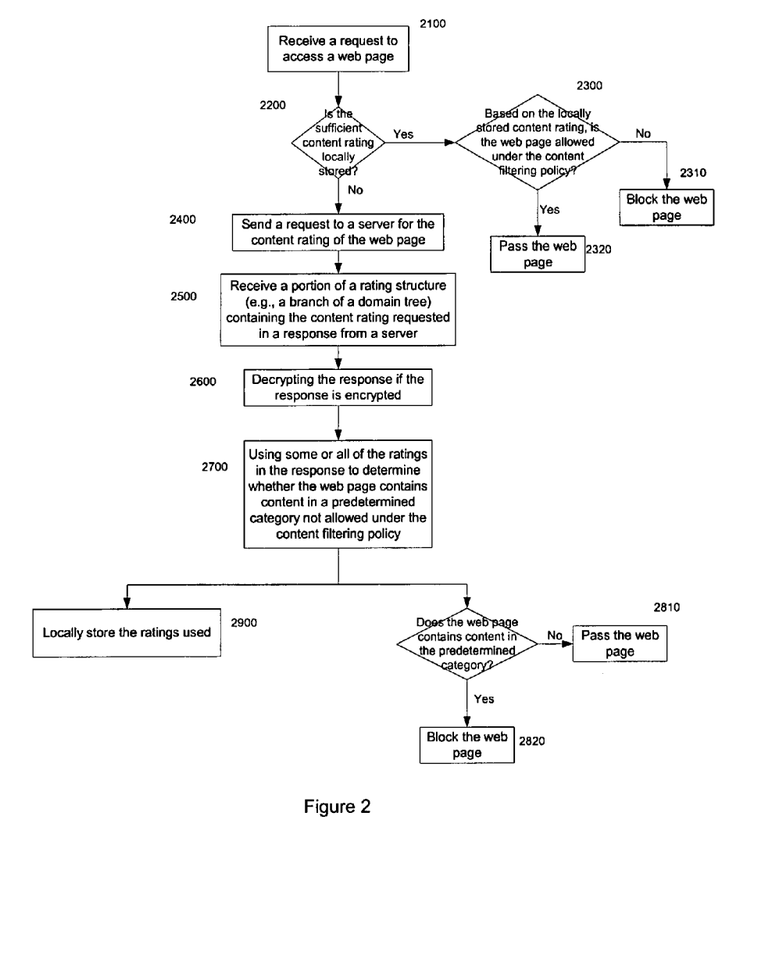
FIG. 2 illustrates a flow diagram of one embodiment of a process for handling a request to access a web page.

FIG. 2 illustrates a flow diagram of one embodiment of a process for handling a request to access a web page. The process is performed by processing logic that may comprise hardware (e.g., circuitry, dedicated logic, etc.), software (such as is run on a general-purpose computer system or a dedicated machine), or a combination of both.

At processing block 2100, processing logic receives a user request to access a web page in a domain. In response to the request, processing logic checks whether the content rating of the web page or sufficient domain tree rating information of the domain is locally stored in a CFC (processing block 2100). If the content rating is locally stored, processing logic determines whether access to the web page is allowed under the content filtering policy of the CFC based on the locally stored content rating (processing block 2300). If access is allowed, processing logic passes the web page to the user (processing block 2320). Otherwise, processing logic blocks the web page (processing block 2310).

If the content rating is not locally stored in the CFC, processing logic sends a request to a server for the content rating of the web page (processing block 2400). Then processing logic may receive a portion of a rating structure (e.g., a branch of a domain tree) containing the content rating in a response from the server (processing block 2500). In some embodiments, the response is encrypted, and thus, processing logic decrypts the response (processing block 2600). Processing block uses some or all of the content ratings in the response to determine whether the web page contains content in one or more predetermined categories forbidden under the content filtering policy (processing block 2700). Some examples of determining whether a web page contains content in a predetermined category have been described above with reference to FIGS. 1A-1E.

Referring back to FIG. 2, if the web page contains content not allowed under the content filtering policy, processing logic blocks the web page (processing block 2820). Otherwise, processing logic passes the web page to the user (processing block 2810).

Processing logic also locally stores the content ratings used to make the above determination (processing block 2900). Hence, for subsequent requests to access web pages in the same domain, processing logic may be able to rely on these locally stored content ratings to determine whether to block or to allow the web pages. In some embodiments, the response from the server includes a parameter (e.g., time-to-live (TTL) parameter) to indicate when the content ratings may expire.

Figure 3:
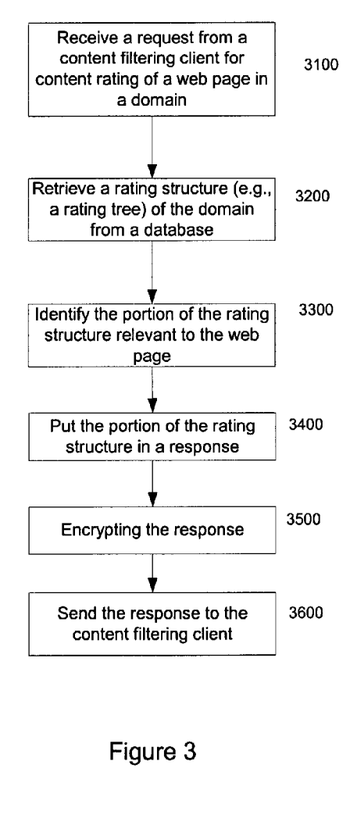
FIG. 3 illustrates a flow diagram of one embodiment of a process for responding to content rating requests from a CFC.

FIG. 3 illustrates a flow diagram of one embodiment of a process for responding to content rating requests from a CFC. The process is performed by processing logic that may comprise hardware (e.g., circuitry, dedicated logic, etc.), software (such as is run on a general-purpose computer system or a dedicated machine or server), or a combination of both.

In one embodiment, processing logic receives a request for the content rating of a web page in a domain from a CFC (processing block 3100). The request may be sent in response to a user request to access the web page. In response to the request, processing logic retrieves a rating structure (e.g., a rating tree) corresponding to the domain from a database (processing block 3200). Processing logic identifies the portion of the rating structure relevant to the web page (processing block 3300). For example, if the web page requested is www.contentprovider1.com/Sports/Baseball 318 (shown in FIG. 1A) and the rating structure is the rating tree 320 in FIG. 1D, then processing logic may identify the branch 317 in FIG. 1D.

Referring back to FIG. 3, processing logic puts the portion of rating structure identified into a response (processing block 3400). Then processing logic may encrypt the response (processing block 3500). Finally, processing logic sends the response to the CFC (processing block 3600).

Although the above embodiments are used to store content rating of web pages, one should appreciate that the technique disclosed is applicable to store generally any kind of information regarding web pages to allow efficient storage and/or delivery of such information.

Figure 4:
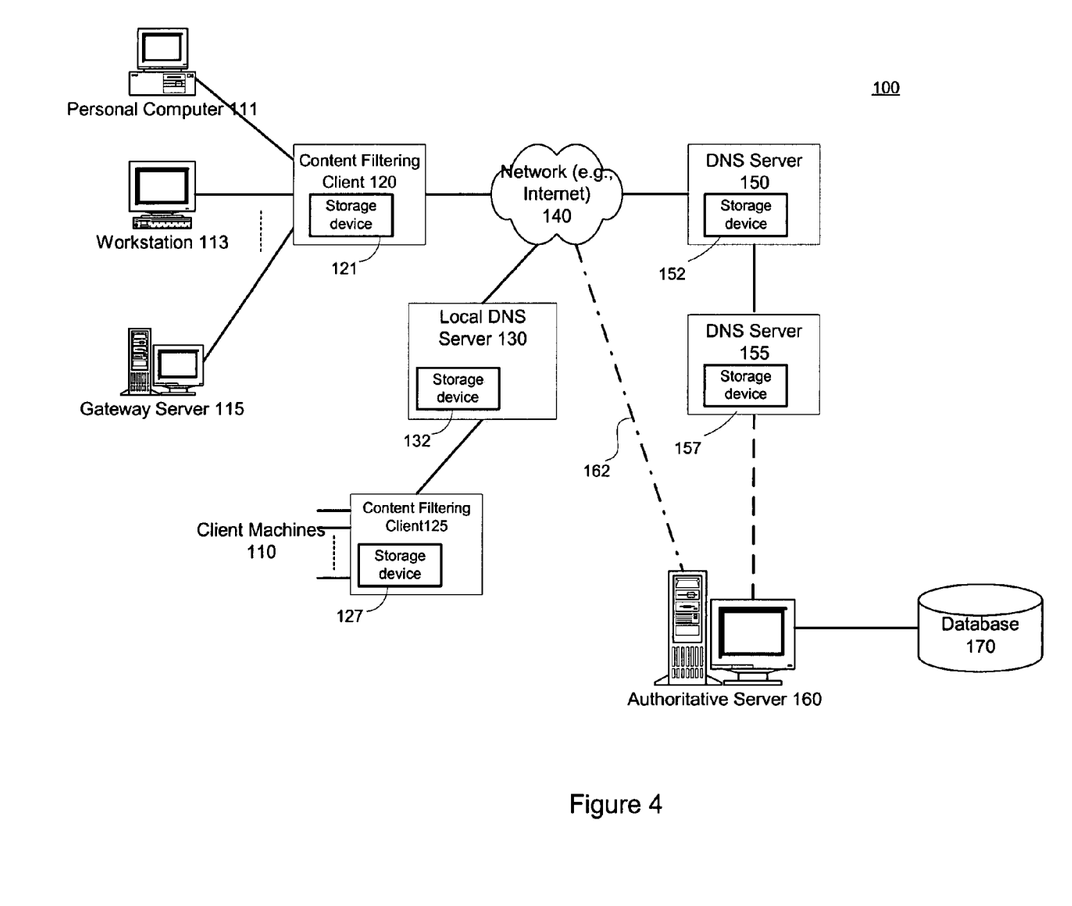
FIG. 4 illustrates a networked system usable with one embodiment of the invention.

FIG. 4 shows a networked system usable with one embodiment of the invention. The system 100 includes a first set of client machines, including, but not limited to, a personal computer 111, a workstation 113, and a gateway server 115; a first content filtering client 120; a second set of client machines 110; a second content filtering client 125; a local domain name service (DNS) server 130; a network 140; a DNS infrastructure, including, but not limited to, an authoritative server 160 and a database 170. In some embodiments, the DNS infrastructure further includes one or more DNS servers, such as a first DNS server 150 and a second DNS server 155 in FIG. 4.

Note that any or all of the components and the associated hardware illustrated in FIG. 4 may be used in various embodiments of the networked system 100. However, it should be appreciated that other configurations of the networked system 100 may include more or less devices than those shown in FIG. 4.

Referring to FIG. 4, the personal computer 111, the workstation 113, and the gateway server 115 are coupled to the first content filtering client 120. Likewise, the second set of client machines 110 is coupled to the second content filtering client 125. One should appreciate that the personal computer 111, the workstation 113, and the gateway server 115 are used as examples in FIG. 4 to illustrate the concept. Different types and/or combinations of client machines may be included in various embodiments.

Each of the content filtering clients 120 and 125 includes a local storage device 121 and 127, respectively. The local storage devices 121 and 127 may include any of various types of machine readable media, such as, for example, random access memory (RAM), dynamic random access memory (DRAM), flash memory, etc.

The content filtering clients 120 and 125 may be further coupled to the network 140, directly or indirectly. For example, the content filtering client 125 is coupled to the network 140 via the local DNS server 130 while the content filtering client 120 is directly coupled to the network 140. The network 140 may include a local area network (LAN), or a wide area network (WAN), etc. In one embodiment, the network 140 includes an Internet. The network 140 is further coupled to the authoritative server 160 in the DNS infrastructure. In some embodiments, the network 140 is coupled to the authoritative server 160 via one or more DNS servers (e.g., the DNS servers 150 and 155). Furthermore, the various components and the associated hardware shown in FIG. 4 may be coupled to each other via wired connections, wireless connections, or a combination of both.

One feature of the DNS infrastructure is its distributed nature. In one embodiment, the DNS infrastructure is a distributed database used by Transfer Control Protocol/Internet Protocol (TCP/IP) applications to map between hostnames and Internet Protocol (IP) addresses and to provide electronic mail routing information. Note that the hostname to IP address mapping may not be centrally located in a single database. Instead, each site (such as a company, campus, or department) maintains the site's own database of such mappings and runs one or more server programs on one of the DNS servers. Other systems communicably coupled to the DNS server via the Internet may query the DNS server for mapping information. A request sent to the DNS infrastructure for mapping information is hereinafter referred to as a standard DNS request. Likewise, a response to a standard DNS request is herein referred to as a standard DNS response.

In addition to the distributed nature of the DNS infrastructure, another feature of the DNS infrastructure involves the ability of a DNS server to locally store or to cache certain predetermined information. For example, each of the DNS servers 150 and 155 in FIG. 4 includes a local storage device 152 and 157, respectively. The local storage devices 152 and 157 may include any of various types of memory devices, such as, for example, random access memory (RAM), dynamic random access memory (DRAM), flash memory, etc. A DNS server may store responses routed through the DNS server in the local storage device within the DNS server. Using the locally stored responses, the DNS server may be able to respond to subsequent requests for the same information. The responses stored in the DNS server may be maintained for a predetermined period of time. In one embodiment, the predetermined period is specified by a time-to-live (TTL) parameter in the responses. By locally storing the responses in the storage device of the DNS server, the time for responding to the subsequent requests can be reduced because the further requests are not routed to additional servers. Likewise, the volume of network traffic for transmitting DNS responses may also be reduced.

Instead of coupling to the authoritative server 160 via the DNS infrastructure, the network 140 is directly connected to the authoritative server 160 in some embodiments. For example, the dotted line 162 in FIG. 4 represents such a 'direct connection. The authoritative server 160 is further coupled to a database 170, which the authoritative server 160 may access to retrieve content rating information of web pages.

In one embodiment, the database 170 is maintained by a content filtering service provider. Web pages may be evaluated automatically or manually to generate content rating of the web pages. The content filtering service provider may update the database 170 with the content rating generated.

Figure 5:
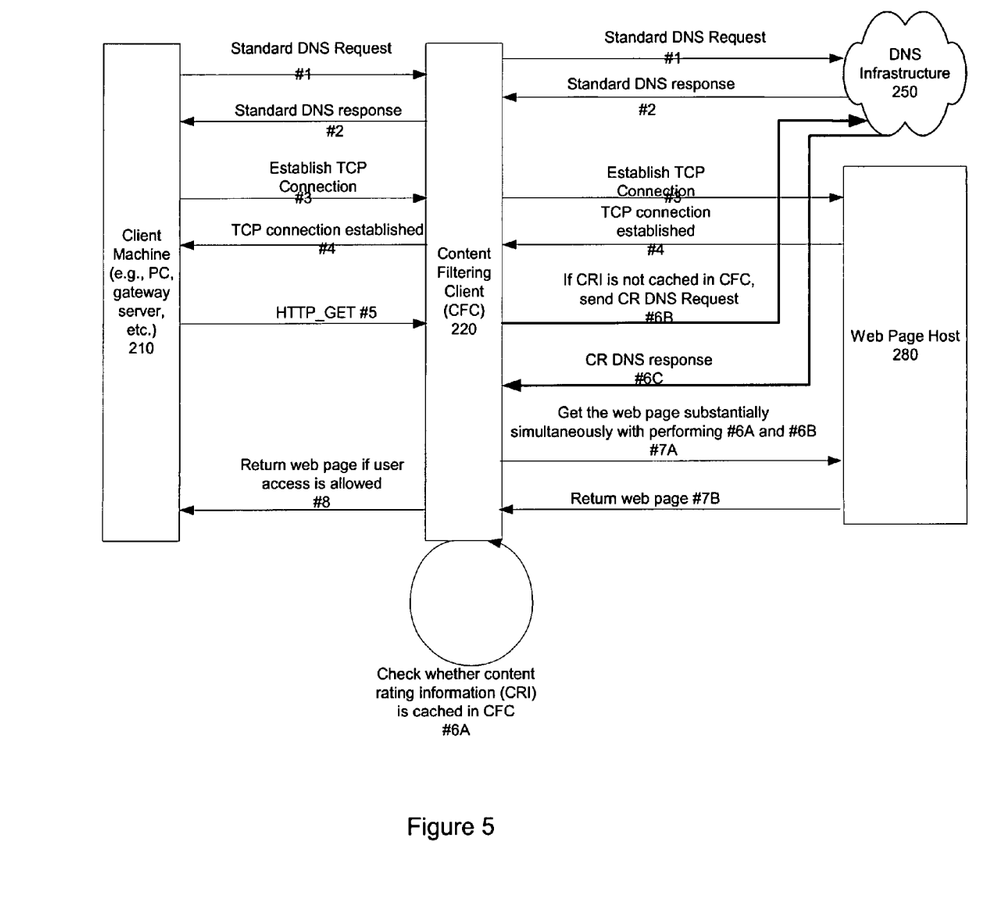
FIG. 5 illustrates a call diagram of one embodiment of a process for requesting web pages and content ratings of the web pages in response to a user request.

FIG. 5 illustrates a call diagram of a process to request web pages and content rating thereof according to one embodiment of the invention. Some exemplary requests and responses between a client machine 210, a content filtering client (CFC) 220, a web page host 280, and a DNS infrastructure 250 are shown in FIG. 5 for the purpose of illustrating the concept. However, some embodiments of the invention may include more or less requests and/or responses than those illustrated in FIG. 5. Furthermore, although the embodiment shown in FIG. 5 uses a proxy for content filtering, one should appreciate that the technique disclosed is also applicable to other types of content filtering, such as Stateful Packet Inspection (SPI).

Referring to FIG. 5, the client machine 210 may include the personal computer 111, the workstation 113, and the gateway server 115 shown in FIG. 4. The CFC 220 may be run on any network access device, such as modems, routers, firewalls, etc. The DNS infrastructure 250 may include any number of DNS servers (e.g., the DNS servers 150 and 155 in FIG. 4) and an authoritative server (e.g., the authoritative server 160 in FIG. 4).

Referring to FIG. 5, the client machine 210 sends a standard DNS request #1 to the CFC 220 to request the IP address of a web page. The CFC 220 forwards the standard DNS request #1 to the DNS infrastructure 250. In response to the standard DNS request #1, the DNS infrastructure 250 sends a standard DNS response #2 containing the IP address of the web page to the CFC 220. Then the CFC 220 forwards the standard DNS response #2 to the client machine 210.

Using the IP address of the web page, the client machine 210 establishes a Transfer Control Protocol (TCP) connection #3 with the CFC 220. Likewise, the CFC 220 also establishes a TCP connection #3 with the web page host 280 using the IP address. When the TCP connection #3 is established, the web page host 280 sends a confirmation #4 to the CFC 220 to indicate so. Likewise, the CFC 220 sends a confirmation #4 to the client machine 210.

Via the TCP connection #3, the client machine 210 sends a request #5 for the web page to the CFC 220. In one embodiment, the client machine 210 uses the Hypertext Transfer Protocol (HTTP). The request #5 may include one or more HTTP commands, such as HTTP_GET, HTTP_POST, HTTP_INFO, etc. In response to the request #5, the CFC 220 checks whether the content rating information (CRI) of the web page is locally stored in the CFC 220 (process #6A). In some embodiments, the CRI includes portions of rating trees containing content ratings corresponding to web pages previously requested. Various embodiments of rating trees and content ratings have been discussed in detail with reference to FIGS. 1A-1E.

Based on the CRI, the CFC 220 may determine whether the client machine 210 is allowed to access the web page. If the CRI is not available in the CFC 220 or the CRI locally stored is not sufficient for the CFC 220 to determine whether the requested web page is allowed, then the CFC 220 requests the CRI from the DNS infrastructure 250. To request the CRI, the CFC 220 may send a Content Rating (CR) DNS request #6B to the DNS infrastructure 250. Unlike the standard DNS requests, which are sent to query mapping information of web pages, the CR DNS requests are sent to request CRI of web pages. Details of the CR DNS requests are discussed below with reference to FIG. 1. In response to the CR DNS request #6B, the DNS infrastructure 250 sends a CR DNS response #6C including the CRI to the CFC 220. The DNS response #6C may be routed through any DNS servers that the DNS request #6B has passed through. Furthermore, these DNS servers may store a copy of the CR DNS response #6C locally before forwarding the CR DNS response #6C. In one embodiment, the CRI in the CR DNS response #6C is encrypted for security.

Unlike the existing approach, the CFC 220 sends a request #7A for the web page to the web page host 280 prior to getting the CRI of the web page. Since the CFC 220 does not wait for checking the CRI before requesting the web page, the potential delay in forwarding the web page to the client machine 210 is reduced. In one embodiment, the CFC 220 sends the CR DNS request #6B and the request for the web page #7A substantially simultaneously or substantially in parallel. Alternatively, the CFC 220 may send the request for the web page #7A and check whether the CRI is locally stored in the CFC 220 (process #6A) substantially simultaneously or substantially in parallel.

In response to the request #7A for the web page, the web page host 280 sends the web page #7B to the CFC 220. If the CRI arrives at the CFC 220 before the web page does, then the CFC 220 uses the CRI to determine whether the client machine 210 is allowed to access the web page. If access is allowed, the CFC 220 forwards the web page #8 to the user. Otherwise, the CFC 220 does not forward the web page to the user. Instead, the CFC 220 may send a predetermined page or a notice to inform the client machine 210 that access to the requested web page is not allowed.

However, if the web page arrives at the CFC 220 before the CRI does, then the CFC 220 may hold the web page and wait for the CRI for a predetermined period of time. When the predetermined period expires and the CRI still has not arrived, the CFC 220 may nevertheless forward the web page #8 to the client machine 210. Otherwise, if the CRI arrives before the predetermined period expires, the CFC 220 uses the CRI to determine whether the client machine 210 is allowed to access the web page. If access is allowed, the CFC 220 forwards the web page to the user (#8). Otherwise, the CFC 220 does not forward the web page to the user. Instead, the CFC 220 may send a predetermined page or a notice to inform the client machine 210 that access to the requested web page is not allowed. In some embodiments, the CRI arrived is encrypted, and thus, the CFC 220 decrypts the CRI.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the invention is not described with reference to any particular programming language. It will be appreciated that a variety of programming languages may be used to implement the teachings of the invention as described herein.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the invention. One skilled in the art will readily recognize from such discussion, the accompanying drawings and the claims that various modifications can be made without departing from the spirit and scope of the invention.

What is claimed is:

1. A method comprising:
receiving content ratings in a portion of a data structure regarding a web page in a domain from a server;
using a subset of the content ratings to evaluate the web page based on one or more content filtering policies, wherein the data structure includes a rating tree of the domain, a structure of the rating tree corresponding to a domain structure of the domain such that a root of the rating tree contains a content rating of a main page of the domain and one or more child nodes of the root of the rating tree contain one or more content ratings of one or more web pages that are one logical level below the main page; and
locally storing the subset of the information.

2. The method of claim 1, wherein the portion of the data structure includes the root, a first node corresponding to the web page, and any nodes coupling the first node to the root.

3. The method of claim 2, wherein using the subset of the content ratings to evaluate the web page comprises:
evaluating the content rating of the main page in the root to determine whether the web page is allowed under the content filtering policies; and
evaluating a content rating in a node on a next level of the rating tree if the evaluating the content rating in the root fails to determine whether the web page is allowed.

4. The method of claim 1, wherein the content ratings in the portion of the data structure includes a trusted rating.

5. The method of claim 1, wherein the content ratings in the portion of the data structure includes an untrusted rating.

6. A method comprising:
receiving a portion of a rating structure from a server, wherein the rating structure includes a rating tree of the domain, a structure of the rating tree corresponding to a domain structure of the domain such that a root of the rating tree contains a content rating of a main page of the domain and one or more child nodes of the root of the rating tree contain one or more content ratings of one or more web pages that are one logical level below the main page, and the one or more web pages including a first web page requested by a user; and
using a subset of the content ratings to determine whether the first web page has content in a category based a content filtering policy.

7. The method of claim 6, further comprising:
locally storing the subset of the content ratings;
in response to a subsequent request for a second web page in the domain, checking the locally stored content ratings to determine whether the second web page has content in the category; and
requesting additional content ratings for the second web page if checking the locally stored content ratings fails to determine whether the second web page has content in the category.

8. A method comprising:
retrieving a rating structure of a domain from a database in response to a content rating request on a web page in the domain from a content filtering client, wherein the rating structure includes a rating tree of the domain, a structure of the rating tree corresponding to a domain structure of the domain such that a root of the rating tree contains a content rating of a main page of the domain and one or more child nodes of the root of the rating tree contain one or more content ratings of one or more web pages that are one logical level below the main page, wherein the one or more web pages include the web page;

identifying a portion of the rating structure relevant to the web page; and sending the portion in a response to the content filtering client.

9. The method of claim 8, further comprising sending the portion in a response to the content filtering client.

10. The method of claim 9, further comprising encrypting the response.

11. A non-transitory computer readable medium storing executable instructions that, when executed by a processor, will cause the processor to perform operations comprising:

determining whether a web page and a plurality of sub-directories of the web page are in a first category;

assigning a first rating of a first type to the web page if contents of the web page and the plurality of sub-directories are in the first category; and storing the first rating in a rating tree, wherein a structure of the rating tree corresponding to a domain structure of a domain such that a root of the rating tree contains a content rating of a main page of the domain and one or more child nodes of the root of the rating tree contain one or more content ratings of one or more web pages that are one logical level below the main page.

12. The non-transitory computer readable medium of claim 11, wherein the operations further comprise assigning a second rating of a second type to the web page if contents of at least one of the web page and the plurality of sub-directories are in the first category but not all of the web page and the plurality of sub-directories are in the first category.

13. The non-transitory computer readable medium of claim 12, wherein the operations further comprise performing a bitwise union operation on a plurality of content ratings to generate the second rating, the web page and the plurality of sub-directories contain contents in each of a plurality of categories corresponding to the plurality of category content ratings.

14. A non-transitory computer readable medium storing executable instructions that, when executed by a processor, will cause the processor to perform operations comprising:

sending a content rating request on a first web page;

receiving a branch of a rating tree of a domain associated with the first web page, the first web page being in the domain, the branch including content ratings of the first web page, a main page of the domain, and any sub-directories between the first web page and the main page, wherein a structure of the rating tree corresponding to a domain structure of the domain such that a root of the rating tree contains a content rating of the main page of the domain and child nodes of the root of the rating tree contain content ratings of one or more web pages that are one logical level below the main page; and using a subset of the content ratings received to determine whether access to the first web page is allowed based on one or more predetermined content filtering policies.

15. The computer readable storage medium of claim 14, further comprising locally storing the subset of the content ratings.

16. The computer readable storage medium of claim 14, further comprising:

checking the locally stored content ratings in response to a subsequent request to access a second web page in the domain to determine whether access to the second web page is allowed based on the one or more predetermined content filtering policies.

17. A system comprising:

a content filtering client to determine whether web pages requested by users are allowed under one or more content filtering policies; and a server, communicably coupled to the content filtering client, to send a portion of a rating structure associated with the requested web pages to the content filtering client if the content filtering client requests content ratings of the web pages, wherein the content filtering client is operable to use a subset of one or more content ratings in the portion of the rating structure to determine whether the web pages are allowed under the one or more content filtering policies, wherein the rating structure includes a rating tree of a domain containing the web pages, a structure of the rating tree corresponding to a domain structure of the domain such that a root of the rating tree contains a content rating of a main page of the domain and one or more child nodes of the root of the rating tree contain one or more content ratings of one or more web pages that are one logical level below the main page.

18. The system of claim 17, wherein the content filtering client includes a local storage device to store the subset of one or more content ratings.

19. The system of claim 17, wherein the content filtering client is within a network access device.

20. The system of claim 17, further comprising a database coupled to the server.

* * * * *